Sept. 26, 1961    R. PICOLA    3,001,272
METHOD OF ENGRAVING PRINT ROLLER
Filed Nov. 4, 1957
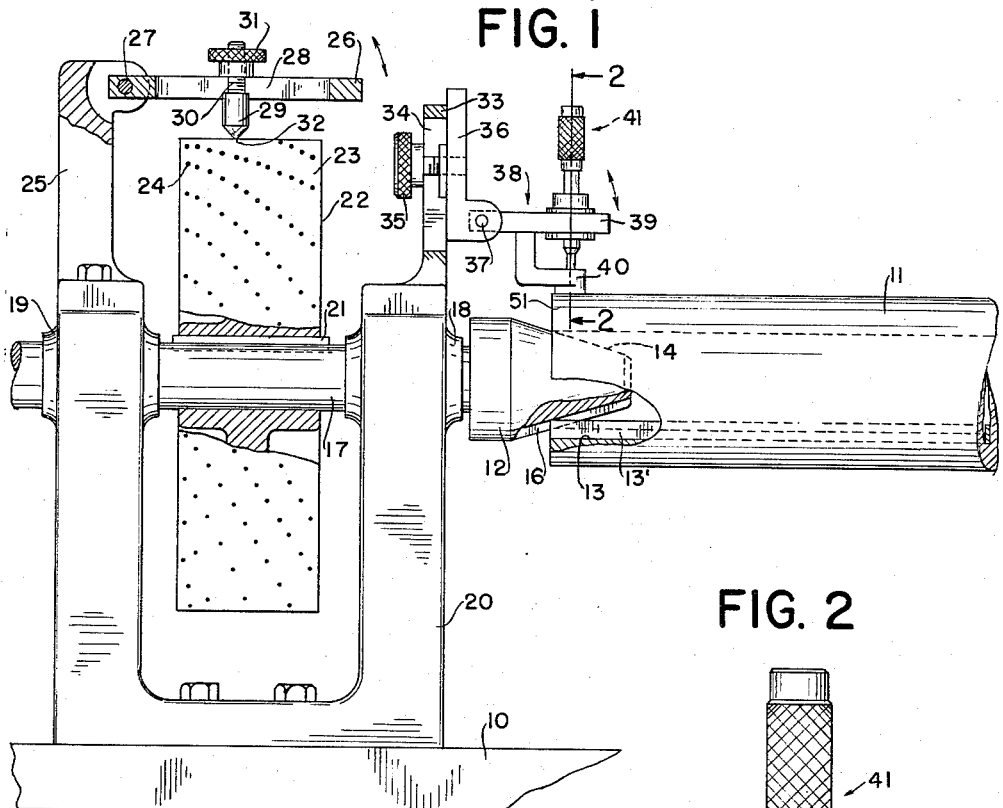
FIG. 1
FIG. 2
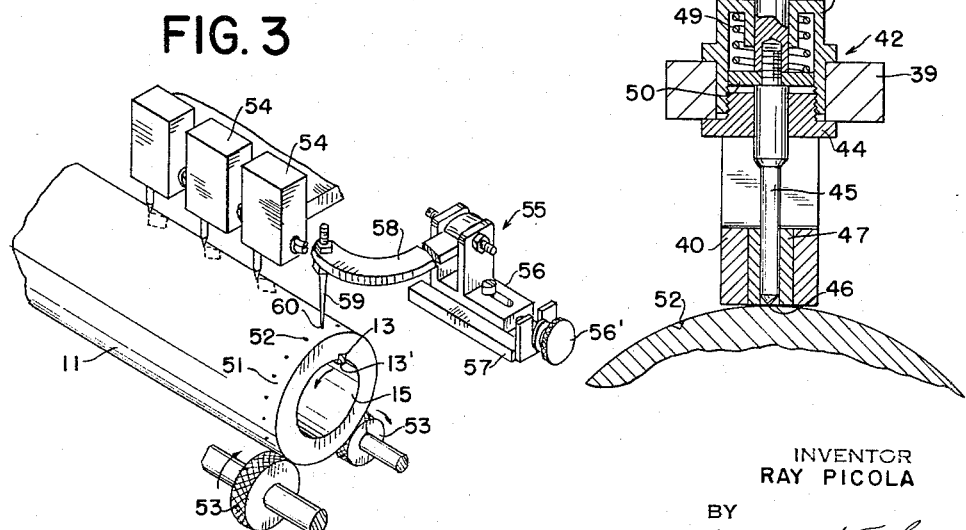
FIG. 3
INVENTOR
RAY PICOLA
BY
Pennie, Edmonds, Morton, Barrows & Taylor
ATTORNEYS

United States Patent Office 3,001,272
Patented Sept. 26, 1961

3,001,272
METHOD OF ENGRAVING PRINT ROLLER
Ray Picola, 1615 Augusta St., West Columbia, S.C.
Filed Nov. 4, 1957, Ser. No. 694,454
5 Claims. (Cl. 29—407)

The present invention relates to the engraving of rollers, and like operations, and has particular reference to improved arrangements for dividing and indexing a print roller, for example, to facilitate the engraving of a print design thereon.

In the preparation of print rollers, for printing textile designs and the like, it is conventional to employ a pantograph apparatus, which includes means for supporting a roller, and a suitable engraving device. The engraver may work upon relatively small parts or segments of the roller at a time, and the pantograph apparatus usually includes means for periodically adjusting the rotary reference position of the roller, so that a complete design or series of designs may be engraved thereupon.

Normally, accurate dividing or indexing of the roller on the pantograph apparatus is difficut and time consuming, and not infrequently a roller is ruined, after many hours of engraving work, because of an error or inaccuracy in indexing. Accordingly, the present invention provides an improved method for dividing and indexing print rollers whereby the time required is greatly reduced, and the possibility of loss or scrapping of work, due to error in indexing or dividing is virtually eliminated.

In general, the new method involves the forming of indexing or dividing impressions in the roller, after the turning thereof on a lathe and while the roller remains supported in the turning lathe. The marked roller is then transferred to a pantograph apparatus having a positioner adapted to be received in or aligned with the dividing impressions. The positioner is located in fixed reference to the support for the roller, so that, by engaging the positioner successively in the dividing impressions, the roller may be accurately indexed, in a minimum of time and with almost no possibility of error.

The apparatus used in the practice of the invention, in accordance with one aspect thereof, comprises an indexing device which is incorporated with a turning lathe and which is operated in conjunction with a marking device adapted to make an impression on the roller after it is indexed through a predetermined angle, from one rotary position to another. The arrangement of the apparatus is such that the roller may be divided in the desired manner immediately after turning and while the roller is still supported in accurate concentric relation to the turning axis of the lathe.

Another aspect of the invention resides in the provision, in an otherwise conventional pantograph engraving apparatus, of means adapted for cooperation with dividing indentations theretofore formed in a print roller, whereby the roller may be quickly and accurately aligned and indexed in the pantograph.

For a better understanding of the invention, and for a description of further novel and advantageous features thereof, reference should be made to the following specification and accompanying drawing, in which:

FIG. 1 is a fragmentary elevation, partly in section, of a lathe apparatus incorporating certain features of the invention;

FIG. 2 is an enlarged fragmentary cross sectional view taken along line 2—2 of FIG. 1; and FIG. 3 is a fragmentary perspective view of a pantograph engraving apparatus incorporating additional features of the invention.

Referring now to the drawing, the numeral 10 designates, generally, a lathe, which is used for turning a print roller 11 to a desired size. The lathe 10, except in the particulars to be described, may be of conventional construction, having a driving head engaging the print roller at one end and including a driving center 12, which supports one end of the roller and rotates it about a fixed turning axis. In the illustrated arrangement, the print roller 11 is hollow, and has a keyway 13 (see FIG. 3) in which is received a key 13' extending the full length of the roller. The outer end 14 of the center 12 is of conical form, for reception in an end opening 15 in the print roller, and has a key slot 16 disposed along a generatrix of the conical end 14. The key 13' is adapted to be received in the key slot 16, to lock the roller 11 and driving center 12 for rotation in unison.

In the apparatus of FIG. 1, the driving center 12 is mounted on a drive shaft 17 journaled at spaced points by means of bearings 18, 19 in a U-shaped journal bracket 20, the bracket 20 being, in turn, mounted on the frame or base of the lathe 10. The shaft 17 is connected to suitable driving means (not shown).

Secured to the drive shaft 17, as by a key 21, is an indexing wheel 22 having a peripheral surface 23 formed with a plurality of circumferential rows of recesses or openings 24. The recesses 24 of each circumferential row are uniformly spaced, and each row has a different number of recesses. The arrangement is such that a large combination of arcuate divisions of the index wheel 22 may be determined by selecting a particular row of recesses 24 and spacing between recesses of the row or between two or more recesses.

Mounted on the journal bracket 20 is a support 25, which extends upwardly from the bracket 20, above the top of the index wheel 22. An arm 26 is pivotally attached to the support 25, by a pin 27, and extends, in its horizontal position, over the top of the index wheel 22. The arm 26 has an elongated slot 28, in which is received an index pin 29. The pin 29 has a threaded portion 30 extending upwardly, through the slot 29, and receiving a hand nut 31. When the nut 31 is loosened, the index pin 29 may be adjusted in the slot 28 and brought into alignment with a selected row of recesses 24. Tightening of the nut 31 then fixes the index pin in its adjusted position.

During operation of the lathe 10, the arm 26 may be pivoted into an upright position, so that the pin 29 is out of contact with the index wheel 22. After completion of turning of the print roller, the arm 26 may be lowered, and the tip 32 of the index pin may be engaged in one of recesses 24. Rotation of the index wheel 22, and hence the print roller 11, through an accurately predetermined arc may be effected by rotating the index wheel until the pin 29 engages another recess 24. By appropriate selection of the rows of recesses 24, and the utilization of appropriate combinations thereof, a large variety of rotational increments may be accurately measured.

Also mounted on the journal bracket 20, and extending upwardly therefrom, is a punch support 33. The support 33 has a vertical slot 34 therein, in which is received a hand screw 35 engaging a slide member 36. Pivotally attached to the slide 36, by a pin 37, is a punch frame 38 having a horizontal arm 39 and a depending guide 40.

As best shown in FIG. 2, the punch frame 38 mounts a punch 41, which may be of conventional design, but which is advantageously of a spring-loaded type. Thus, by way of illustration only, the punch 41 may include a bushing assembly 42, comprised of threaded bushings 43, 44 having flanges contacting the opposite sides of the arm 39. A punch pin 45, having a pointed end 46, is slidably received in the bushing 44 and in a bushing 47 in the guide 40. The punch pin 45 is secured at its upper end to a manipulator rod 48 slidably received in the bushing 43, A spring 49 is received within the bushing assembly 42 and acts downwardly upon a washer 50 carried at the upper end of the punch pin 45.

The illustrated punch assembly is operated by first drawing the manipulator 48 upwardly, against the action of the spring 49, while holding down the punch frame 38. The manipulator is then released, causing the pin 45 to be driven downwardly with a predetermined force, which is substantially uniform on all occasions.

Other forms of punches may, of course, be incorporated in the assembly, and the specific punch illustrated is not to be considered an essential feature of the invention. By way of example, certain conventional spring-loaded punches operate, upon continued downward movement of a manipulator to cock and release a punch pin with a predetermined force; and a punch of this type may be preferred in many cases.

In accordance with the invention, a blank from which the print roller 11 is to be formed is mounted in the lathe 10, and turned to size in a conventional manner, the arm 26 and frame 38 being in raised positions during the turning operation. After completion of the turning operation, the punch frame is lowered, and the slide 36 is properly adjusted to bring the punch into operative position over the end portion 51 of the roller. Likewise, the index pin arm 26 is lowered, and the index pin 29 is adjusted therein to align the pin with a circumferential row of recesses 24 having a number of recesses equal to the number of desired divisions of the print roller, or a multiple thereof. The index wheel 22 is then rotated to bring the pin 29 into alignment with a recess, and the pin point 32 is inserted therein to accurately position the index wheel, and hence also the print roller in a reference position.

When the index wheel and print roller are thus positioned, the punch 41 is operated to form an indentation in the end portion 51 of the roller, as indicated at 52 in FIG. 2. Next, the index pin 29 is withdrawn, and the wheel 22 is rotated to bring another recess into alignment with the pin. For example, if it is desired to divide the roller into eight equal portions, an index row having forty-eight recesses might be used, and the wheel 22 would be rotated in increments of six recesses, after which the pin 29 would be again inserted in a recess and the punch 41 again operated.

In the manner described above, the end portion 51 of the roller may be provided with indentations 52 spaced uniformly and accurately dividing the roller into any predetermined number of segments within a useful range. The use of a spring-loaded punch is advantageous although, perhaps, not of critical importance, since all of the dividing indentations will be of substantially uniform depth.

After the print roller 11 is thus provided with dividing indentations, it is removed from the lathe 10 and placed upon spaced pairs of supporting rollers 53 of a pantograph engraving apparatus, the supporting rollers 53 being arranged to support the opposite ends of the print roller 11, in the manner indicated in FIG. 3. The pantograph apparatus, except as to certain features to be described, is of conventional construction, having a plurality of engraving heads 54 positioned directly above the print roller and adapted for movement axially thereof. The pantograph apparatus also includes means (not shown) for tracing a master design and effecting appropriate relative movement between the engraving head and print roller.

In accordance with the invention, the pantograph apparatus is provided with a positioner assembly 55 comprising a slide 56 mounted on a fixed part 57 of the pantograph apparatus for adjustable movement in a direction axially of the print roller. The slide 56 is normally fixed in one position, but may be adjusted at will, as by means of an adjusting screw 56', for the accommodation of print rollers of various form.

Pivotally secured to the slide 56 is an arm 58, which carries a positioner pin 59 adjacent its outer end. Advantageously, the pin 59 is threaded for adjustment in the direction of its axis, with respect to the arm 58, for the accommodation of rollers of different diameter, and the pin has a pointed end 60 which corresponds substantially in shape to that of the punch pin point 46. The arm 58 is provided with an offset portion 58', which supports the pin 59, to provide clearance for the engraving head 54 working near the end of the roller.

As indicated in FIG. 3, the positioner pin 59 is arranged, when in its vertical position, to lie along an axis located centrally between the supporting rollers 53, whereby the pin 59 may be brought into contact with the print roller in normal or right-angular relation to the tangent at the point of contact.

When a print roller 11 is first placed on the pantograph apparatus, an initial reference position may be established with substantial accuracy by rotating the print roller on its supporting rollers 53 until the positioner pin 59 is aligned with one of the dividing indentations 52. The engraving operations may then proceed in the usual manner. The operator may quickly and easily check the accuracy of the setup from time to time, as may be necessary, by merely realigning the positioner pin and the proper dividing indentation, and indexing of the print roller may be accomplished swiftly and accurately by aligning the pin 59 with a different dividing indentation.

The new method and apparatus greatly facilitate the accurate engraving of print rollers, and substantially eliminates costly mistakes in the setting up of the pantograph apparatus and the proper dividing of the print roller during engraving. In accordance with the invention, dividing indentations are provided in the print roller while the roller is in the turning lathe, in true alignment and in condition for easy handling for accomplishing the proper dividing. Thereafter, the divided roller is taken to the pantograph, which has a simplified and easily usable positioner device for properly referencing and indexing the print roller.

It should be understood, however, that the specific arrangements herein illustrated and described are intended to be representative only, as certain changes and variations may be made therein without departing from the clear teachings of the invention. Accordingly, reference should be made to the following appended claims in determining the full scope of the invention.

I claim:

1. In the method of engraving a print roller, wherein the roller is turned to size in a lathe and then transferred to and supported upon a pantograph apparatus for engraving, the improvement characterized by forming dividing marks on said print roller while the roller is mounted in the lathe, thereafter transferring the roller to the pantograph apparatus, and aligning said print roller with respect to parts of the pantograph apparatus at one or more times during the engraving operation by aligning said dividing marks with an aligning member carried by said pantograph apparatus.

2. The method of claim 1, in which said dividing marks are formed by making indentations in the print roller, and the print roller is aligned with respect to parts of the pantograph apparatus by inserting said aligning member in one or more of said indentations.

3. The method of claim 1, in which the print roller is at least partially turned before forming the dividing marks, to provide a cylindrical portion upon which the marks are made.

4. In the method of engraving a print roller, wherein the roller is turned in a lathe and then transferred to and supported upon an engraving apparatus, the improvement characterized by at least partially turning the print roller in the lathe to provide a cylindrical portion, forming dividing indentations on said cylindrical portion while the roller remains in the lathe, thereafter transferring the print roller to the engraving apparatus, and aligning said print roller with parts of said engraving apparatus by aligning one or more of the dividing indentations with an aligning member carried by the engraving apparatus.

5. The method of claim 4, in which a dividing indentation is aligned with said aligning member at one or more times during the engraving operation.

References Cited in the file of this patent

UNITED STATES PATENTS

| | | |
|---|---|---|
| 921,736 | Rawsthorne | May 18, 1909 |
| 2,089,790 | Halpern | Aug. 10, 1937 |
| 2,306,233 | Smith | Dec. 22, 1942 |
| 2,393,697 | Lornitzo | Jan. 29, 1946 |
| 2,582,275 | Poetzch | Jan. 15, 1952 |
| 2,707,321 | Breisch | May 3, 1955 |
| 2,744,329 | Way | May 8, 1956 |
| 2,798,387 | Woodworth | July 9, 1957 |
| 2,864,158 | Hake | Dec. 16, 1958 |